(12) United States Patent
Espeseth et al.

(10) Patent No.: US 6,640,258 B2
(45) Date of Patent: Oct. 28, 2003

(54) METHOD AND APPARATUS FOR COMMAND QUEUE ORDERING WITH A SORT TIME REDUCTION ALGORITHM

(75) Inventors: Adam Michael Espeseth, Rochester, MN (US); David Robison Hall, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 435 days.

(21) Appl. No.: 09/758,059

(22) Filed: Jan. 10, 2001

(65) Prior Publication Data
US 2002/0091882 A1 Jul. 11, 2002

(51) Int. Cl.⁷ .............................................. G06F 13/00
(52) U.S. Cl. ............................................. 710/5; 710/24
(58) Field of Search .......................... 710/5–7, 22–24, 710/72–74; 711/111–113, 117, 158, 187; 369/534, 444, 244, 137, 75, 201 T

(56) References Cited

U.S. PATENT DOCUMENTS

| | | | | |
|---|---|---|---|---|
| 4,972,364 A | * | 11/1990 | Barrett et al. ............... | 711/117 |
| 5,418,971 A | * | 5/1995 | Carlson ....................... | 710/24 |
| 5,426,736 A | * | 6/1995 | Guineau, III ................ | 710/56 |
| 5,548,795 A | * | 8/1996 | Au .............................. | 710/52 |
| 5,603,063 A | * | 2/1997 | Au .............................. | 710/52 |
| 5,664,143 A | * | 9/1997 | Olbrich ...................... | 711/112 |
| 5,680,539 A | * | 10/1997 | Jones .......................... | 714/6 |
| 5,991,825 A | * | 11/1999 | Ng ............................. | 710/6 |
| 6,141,707 A | * | 10/2000 | Halligan et al. ............. | 710/36 |
| 6,272,565 B1 | * | 8/2001 | Lamberts ..................... | 710/43 |
| 6,301,639 B1 | * | 10/2001 | Cleavinger et al. .......... | 711/112 |
| 6,496,877 B1 | * | 12/2002 | Greenberg et al. ............ | 710/6 |

* cited by examiner

Primary Examiner—Christopher Shin
(74) Attorney, Agent, or Firm—Joan Pennington

(57) ABSTRACT

A method and apparatus are provided for hard disk drive command queue ordering. A command received from a host is placed in a rotational order command list. A fraction of the rotational order command list is analyzed. Commands are analyzed with a maximum selection probability. A maximum analysis time before the currently executing command is completed is determined. The total analysis time cannot exceed the maximum analysis time. The fraction of the rotational order command list is analyzed in a first pass. A skip-sort interval is selected based upon the maximum analysis time and a current queue depth of the rotational order command list. In a second pass, the number of commands analyzed corresponds with the number of commands that can be analyzed in the remaining available processing time.

20 Claims, 6 Drawing Sheets

METHOD AND APPARATUS FOR COMMAND QUEUE ORDERING WITH A SORT TIME REDUCTION ALGORITHM

FIELD OF THE INVENTION

The present invention relates generally to the data processing field, and more particularly, relates to a method and apparatus for hard disk drive command queue ordering with a sort time reduction algorithm.

DESCRIPTION OF THE RELATED ART

In random access storage devices, such as hard disk drives, when there are more than one command to execute, the data to be accessed next is chosen from a list or a queue of outstanding commands. The hard disk drive includes firmware performing a scheduling algorithm to determine the optimal command execution order. In general, the goal of the scheduling algorithm is to minimize the average access time for its commands. Presently, hard disk drives use a Shortest-Access Time First (SATF) algorithm.

The conventional SATF algorithm works as follows: Given a set of commands in a queue, a command is chosen that can be started or accessed first. Various implementations of SATF algorithms exist, but all operate by calculating a score for every command in the queue and choosing the command with the best score for execution.

A significant problem with conventional SATF algorithms exists in workloads that have deep queues, short seeks, and short command latencies. Typically in such workloads there is not enough processor bandwidth to analyze the entire queue before the currently executing command is completed. Command queue ordering algorithms contain CPU intensive operations that take a significant amount of time to complete. If the next command is not selected by the sorting algorithm before the currently executing command is completed, performance is degraded. As a result deeper queues can actually result in slower performance as compared to smaller queues under these workloads.

This problem will become more apparent in the industry as command latencies decrease and queue depths increase. With the introduction of higher speed drives and the demand for higher supported queue depths, this problem is foreseen as a significant hurdle. One approach may be to increase the processing capabilities of the disk drive. This may include increasing the clock speed of an onboard CPU or adding other processing hardware. However, this approach adds significant cost to the disk drive.

A need exists for an improved method and apparatus for hard disk drive command queue ordering.

SUMMARY OF THE INVENTION

A principal object of the present invention is to provide an improved method and apparatus for hard disk drive command queue ordering. Other important objects of the present invention are to provide such method and apparatus for hard disk drive command queue ordering including a sort time reduction algorithm that efficiently and effectively facilitates hard disk drive command queue ordering; to provide such method and apparatus for hard disk drive command queue ordering substantially without negative effect and that overcome many of the disadvantages of prior art arrangements.

In brief, a method and apparatus are provided for hard disk drive command queue ordering. A command received from a host is placed in a rotational order command list. A fraction of the rotational order command list is analyzed. Commands are analyzed with a maximum selection probability.

In accordance with features of the invention, a maximum analysis time before the currently executing command is completed is determined. The total analysis time cannot exceed the maximum analysis time. The fraction of the rotational order command list is analyzed in a first pass. A skip-sort interval is selected based upon the maximum analysis time and a current queue depth of the rotational order command list. In a second pass, the number of commands analyzed corresponds with the number of commands that can be analyzed in the remaining available processing time.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
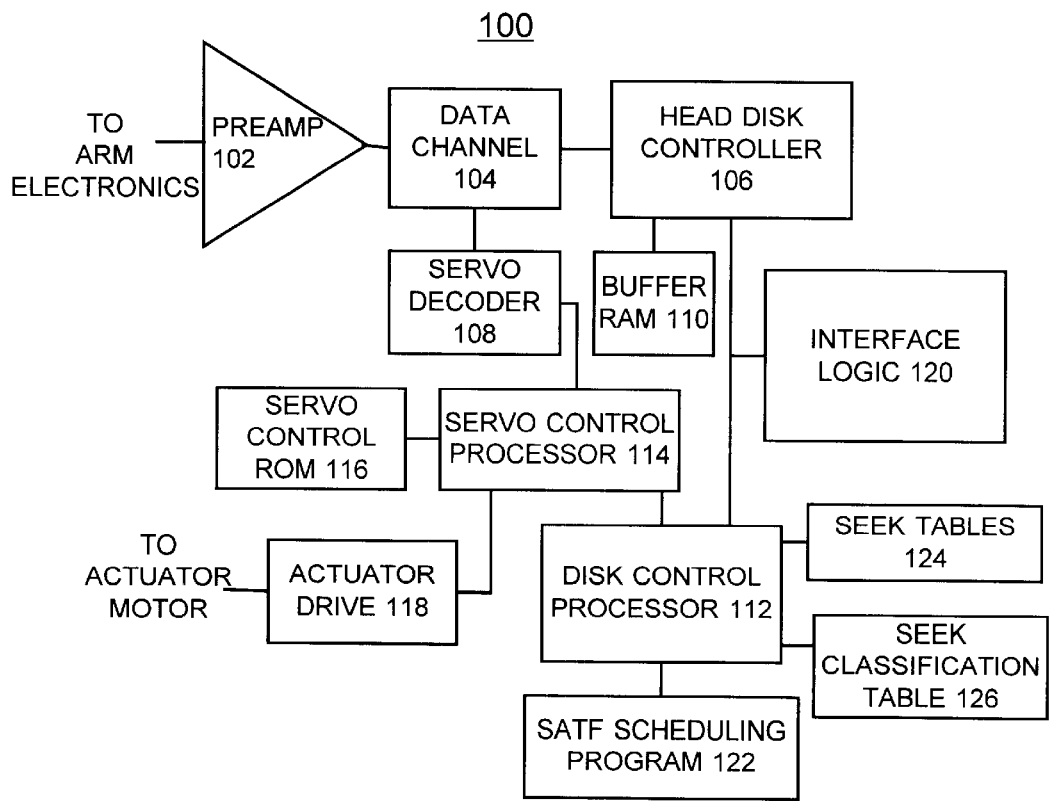
FIG. 1 is a block diagram representation illustrating a disk file system for implementing methods for implementing hard disk drive command queue ordering with a sort time reduction algorithm in accordance with the preferred embodiment.

Having reference now to the drawings, in FIG. 1, there is shown a disk file system for carrying out the scheduling method of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 110 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. Scheduling data accesses is provided with a shortest access time first (SATF) with a sort time reduction algorithm scheduling program 122 of the preferred embodiment coupled to the disk control processor 112. Seek tables 124 and a seek classification table 126 of the preferred embodiment utilized by the SATF scheduling program 122 are coupled to the disk control processor 112. Disk control processor unit 112 is suitably programmed to execute the flow charts of FIGS. 2A, 2B, 2C, and 2D of the preferred embodiment.

In accordance with features of the preferred embodiment, a SATF algorithm is implemented for hard disk drive command queue ordering with a sort time reduction algorithm. A certain amount of processor time is required to analyze each queue element, so the total time required to analyze the queue grows linearly with queue depth. The hard disk drive command queue ordering method of the preferred embodiment allows for the maximum probability of selection of the optimal queue candidate without analyzing the entire queue. It sorts and analyzes the queue in such a way that guarantees that queue analysis will be completed in a specific amount of time. It also employs a skip-sort stage that ensures that the drive will perform at least as well under deeper queues as smaller queues.

In accordance with features of the preferred embodiment, the hard disk drive command queue ordering method allows the sorting algorithm to analyze commands in rotational order. In the conventional arrangements to select the best queue candidate is to analyze commands in the order the commands are received. The hard disk drive command queue ordering method of the preferred embodiment includes placing the commands in rotational order as the commands are issued by the host, analyzing a fraction of the ordered list, and analyzing the commands with maximum selection probability.

Figure 2A:
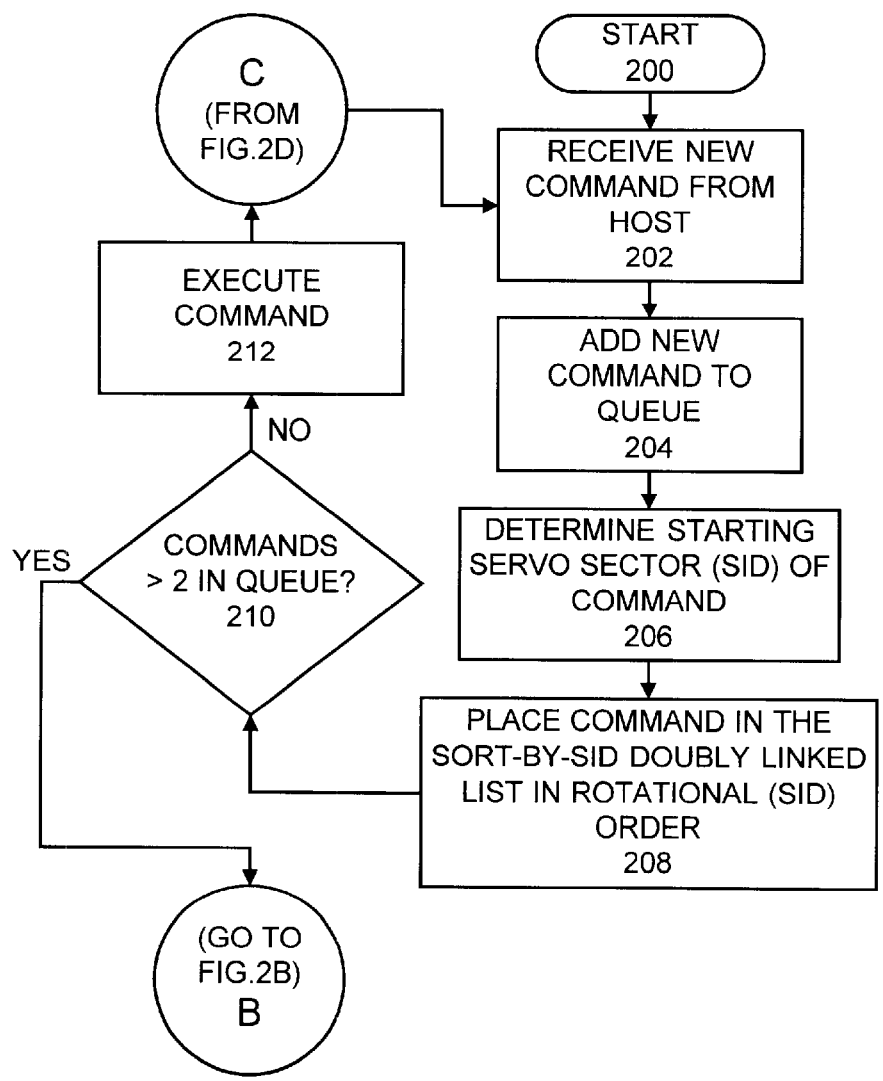
FIGS. 2A, 2B, 2C, and 2D are flow charts illustrating exemplary sequential steps for implementing hard disk drive command queue ordering in accordance with the preferred embodiment.

Referring to FIGS. 2A, 2B, 2C, and 2D, there are shown exemplary sequential steps for implementing hard disk drive command queue ordering in accordance with the preferred embodiment. In FIG. 2A, the sequential steps starting at block 200, first a new command is received from the host as indicated in a block 202. The new command is added to the queue as indicated in a block 204. A starting servo sector (SID) of the new added command is determined as indicated in a block 206. The new command is placed in a sort-by-SID doubly linked list in rotational (SID) order or circular sorted list that is equivalent to rotational time as indicated in a block 208. Checking whether more than two commands are in the queue is performed as indicated in a decision block 210. When two or less commands identified in the queue, then a command is executed as indicated in a block 212. Then the sequential operations return to block 202 to receive a new command from the host. Otherwise when more than two commands are in the queue, then the sequential operations continue following entry point B in FIG. 2B.

Figure 2B:
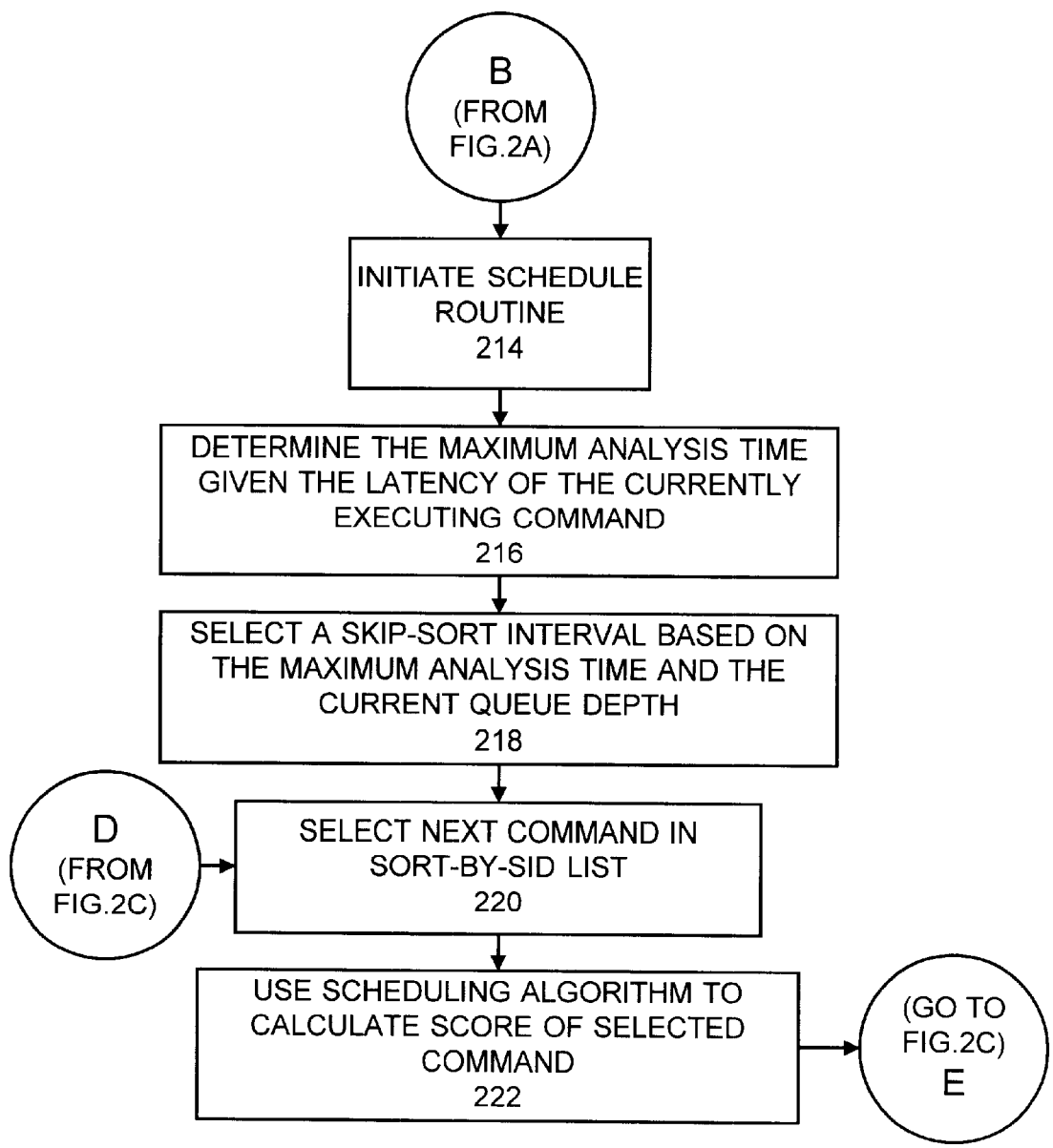

Referring now to FIG. 2B following entry point B, a schedule routine is initiated as indicated in a block 214. Next the maximum analysis time is determined given the latency of the currently executing command as indicated in a block 216. The sorting time or maximum analysis time is estimated to determine how many queue candidates can be analyzed before the currently executing command is completed at block 216. A skip-sort interval is selected based on the maximum analysis time and the current queue depth as indicated in a block 218. A next command in the sort-by-SID list is selected as indicated in a block 220. A scheduling algorithm is used to calculate the score of the selected command as indicated in a block 222. Then the sequential operations continue following entry point E in FIG. 2C.

In the skip-sort stage, the widest possible range of command latencies is analyzed in one pass. The number of commands analyzed by the skip-sort corresponds with how many commands must be analyzed to achieve parity with a lower queue depth. For example, if the current workload has a queue depth of 64, a first pass might analyze 32 candidates to guarantee performance equal or better than the queue depth 32. The number of candidates analyzed in the skip-sort stage is tuneable and can vary depending on the current workload and the desired implementation. If additional time is available, additional skip-sort passes can be made, each offset by one list element so each command is only analyzed once.

Figure 2C:
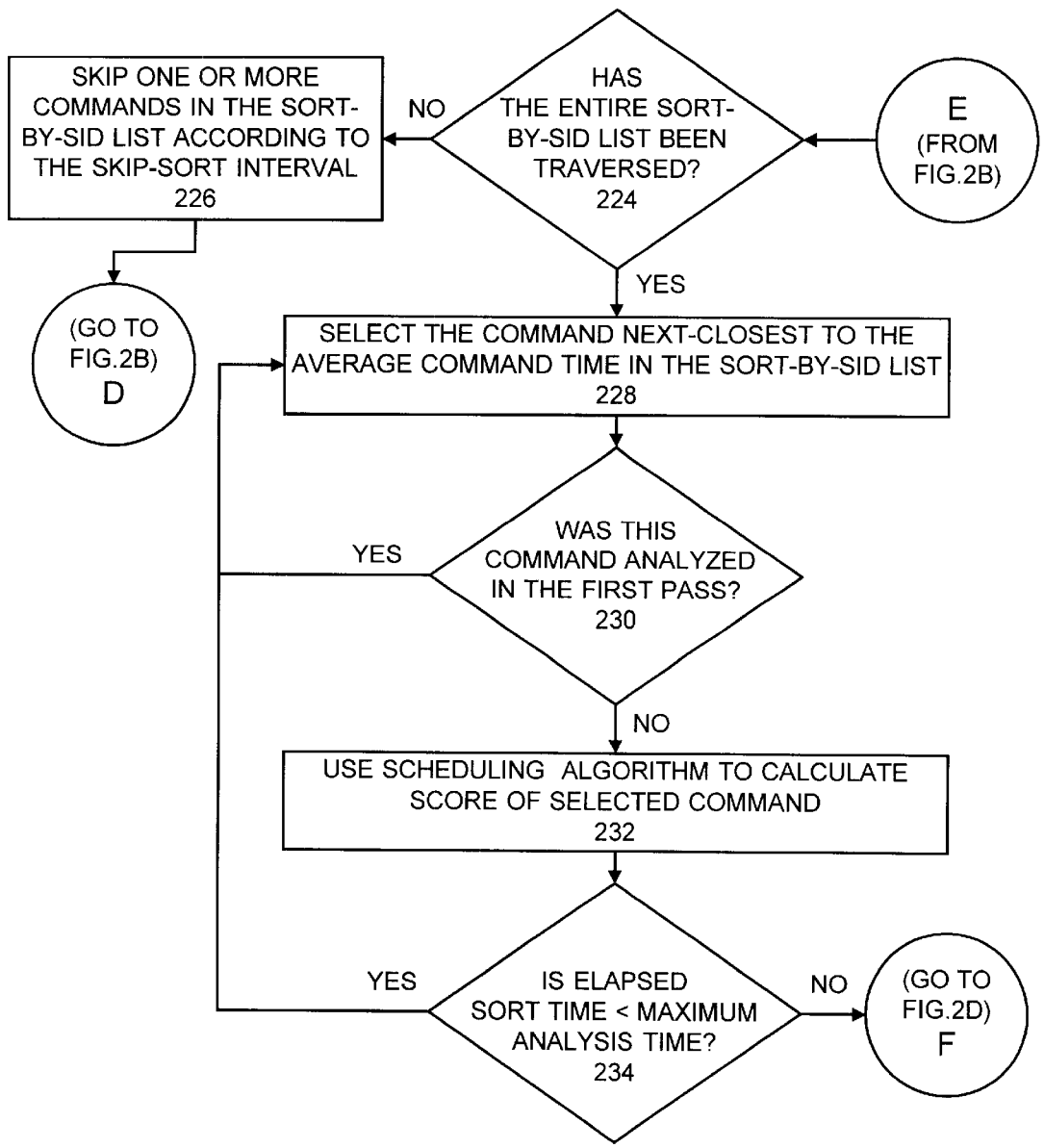

Referring now to FIG. 2C following entry point E, checking whether the entire sort-by-SID list has been traversed is performed as indicated in a decision block 224. When the entire sort-by-SID list has not been traversed, then one or more commands in the sort-by-SID list are skipped according to the skip-sort interval as indicated in a block 226. Otherwise when the entire sort-by-SID list has been traversed, then the command next closest to the average command time in the sort-by-SID list is selected as indicated in a block 228.

The average command execution time is used to determine which candidates will be analyzed in the second pass, after the entire sort-by-SID list has been traversed. This average command execution time can be calculated periodically as the drive operates, so that it reflects the current workload. In the second pass through the list, commands are analyzed starting with the one command with a latency closest to the average command execution time. Then two commands that exist on either side rotationally are analyzed, followed by the next two on either side. During this analysis, commands that were analyzed in the first pass are skipped. Since the average command execution time typically are considered to be drawn from a normal distribution and the commands are in rotational order, this is the order of analysis that maximizes the probability that the best candidate will be analyzed before the sort completes. The number of commands analyzed in the second pass corresponds with the number of commands that can be analyzed in the remaining available processing time.

Checking whether the selected command was analyzed in the first pass is performed as indicated in a decision block 230. When the selected command was analyzed in the first pass, then the sequential operations return to block 228 to select the command next closest to the average command time in the sort-by-SID list. When the selected command was not analyzed in the first pass, then the schedule routing algorithm is used to calculate the score of the selected command as indicated in a block 232. Checking whether the elapsed sort time is less than the maximum analysis time is performed as indicated in a decision block 234. When the elapsed sort time is less than the maximum analysis time, then the sequential operations return to block 228 to select the command next closest to the average command time in the sort-by-SID list. When the elapsed sort time is not less than the maximum analysis time, then the sequential operations continue following entry point F in FIG. 2D.

Figure 2D:
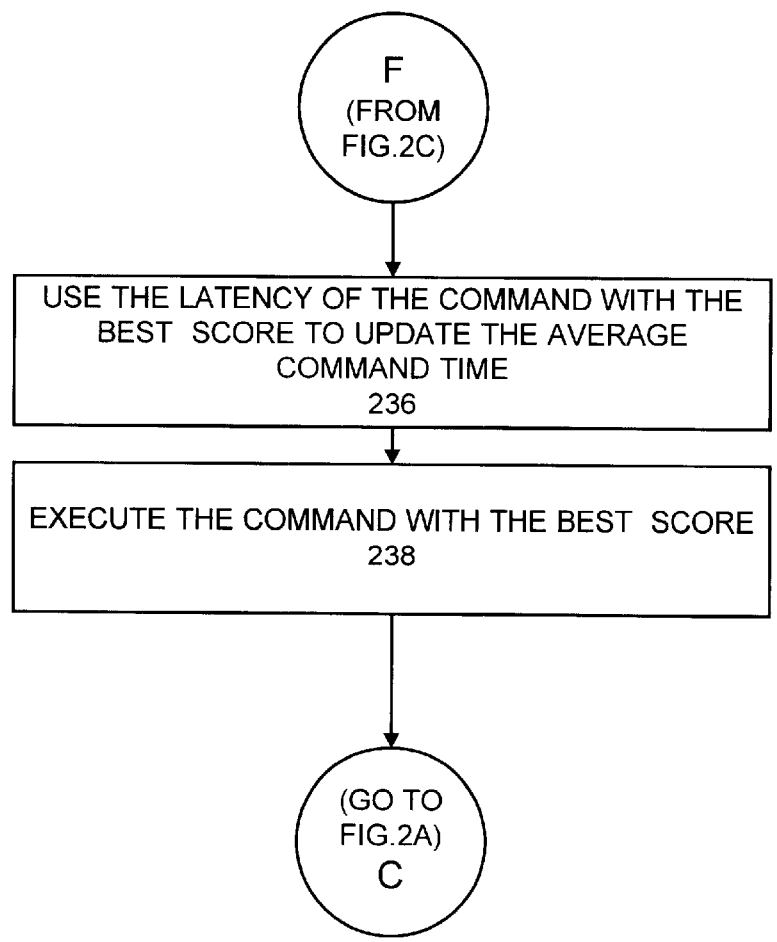

Referring now to FIG. 2D following entry point F, next the latency of the command with the best score is used to update the average command time as indicated in a block 236. The command with the best score is executed as indicated in a block 238. Then the sequential operations return to block 202 following entry point C in FIG. 2A to receive a new command from the host.

Figure 3:
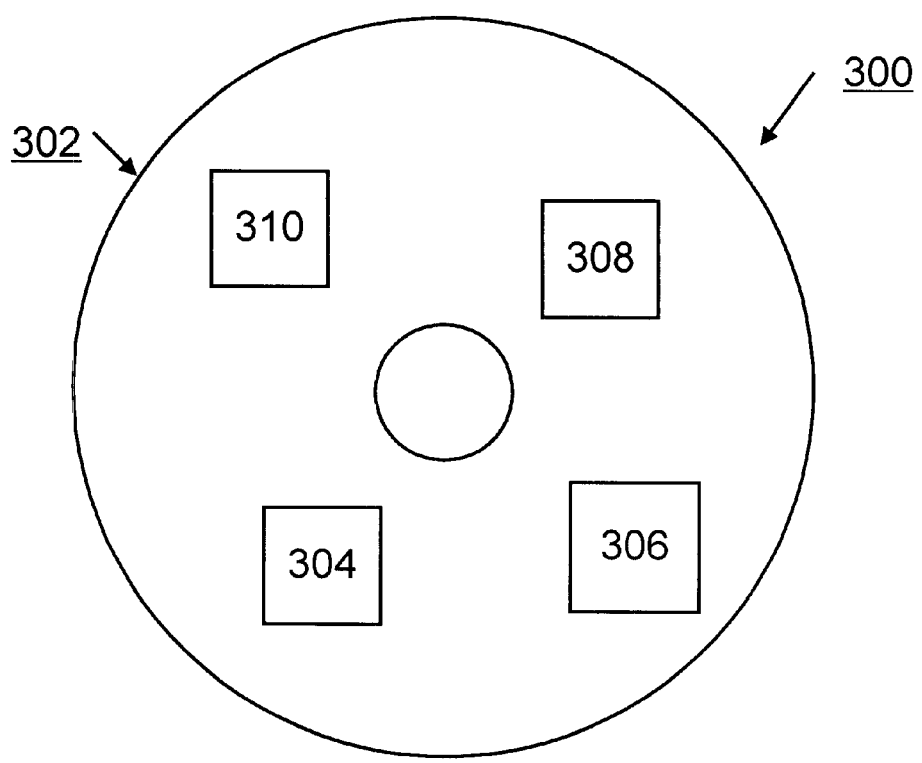
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing hard disk drive command queue ordering of the preferred embodiment in the disk file system 100 of FIG. 1.

A sequence of program instructions or a logical assembly of one or more interrelated modules defined by the recorded program means 304, 306, 308, 310, direct the disk file system 100 for implementing hard disk drive command queue ordering of the preferred embodiment.

While the present invention has been described with reference to the details of the embodiments of the invention shown in the drawing, these details are not intended to limit the scope of the invention as claimed in the appended claims.

What is claimed is:

1. A method for hard disk drive command queue ordering comprising the steps of:

receiving a command from a host;

placing said command in a rotational order command list;

analyzing a fraction of said rotational order command list; and analyzing commands with a maximum selection probability.

2. A method for hard disk drive command queue ordering as recited in claim 1 wherein the step of placing said command in a rotational order command list includes the step of determining a starting servo sector (SID) of said command.

3. A method for hard disk drive command queue ordering as recited in claim 2 further includes the step of placing said command in said rotational order command list in rotational SID order.

4. A method for hard disk drive command queue ordering as recited in claim 1 wherein the step of analyzing a fraction of said rotational order command list includes the step of determining a maximum analysis time before a currently executing command is completed.

5. A method for hard disk drive command queue ordering as recited in claim 4 further includes the step of selecting a skip-sort interval based upon said maximum analysis time and a current queue depth of said rotational order command list.

6. A method for hard disk drive command queue ordering as recited in claim 5 further includes the steps of starting at the current SID command, calculating a score of the current SID command using a scheduling algorithm; skipping one or more commands in said rotational order command list, responsive to said skip-sort interval.

7. A method for hard disk drive command queue ordering as recited in claim 6 further includes the step of selecting a next command in said rotational order command list; calculating a score of the selected command using a scheduling algorithm; skipping one or more commands in said rotational order command list, responsive to said skip-sort interval.

8. A method for hard disk drive command queue ordering as recited in claim 7 further includes the step of traversing the entire rotational order command list, and analyzing said commands with said maximum selection probability.

9. A method for hard disk drive command queue ordering as recited in claim 4 wherein the step of analyzing commands with a maximum selection probability includes the step of selecting a command next closest to an average command time in said rotational order command list and said command not selected in a first skip-sort pass of said rotational order command list.

10. A method for hard disk drive command queue ordering as recited in claim 9 further includes the step of calculating a score of the selected command using a scheduling algorithm, and comparing an elapsed sort time with said maximum analysis time.

11. A method for hard disk drive command queue ordering as recited in claim 10 further includes the step of selecting a command next closest to an average command time in said rotational order command list and said command not selected in a first skip-sort pass of said rotational order command list, responsive to said elapsed sort time less than said maximum analysis time.

12. A method for hard disk drive command queue ordering as recited in claim 10 further includes the step of responsive to said elapsed sort time greater than or equal to said maximum analysis time, executing a command with a best calculated score.

13. A method for hard disk drive command queue ordering as recited in claim 10 further includes the step of responsive to said elapsed sort time greater than or equal to said maximum analysis time, updating an average command time in said rotational order command list.

14. A computer program product for hard disk drive command queue ordering in a disk drive including a processor unit, said computer program product including a plurality of computer executable instructions stored on a computer readable medium, wherein said instructions, when executed by said processor unit, cause the processor unit to perform the steps of:

receiving a command from a host;

placing said command in a rotational order command list;

analyzing a fraction of said rotational order command list; and analyzing commands with a maximum selection probability.

15. A computer program product for hard disk drive command queue ordering in a disk drive as recited in claim 14 wherein said instructions, when executed by said processor unit, cause the processor unit to perform the steps of: identifying a maximum analysis time before a currently executing command is completed.

16. A computer program product for hard disk drive command queue ordering in a disk drive as recited in claim 15 wherein said instructions, when executed by said processor unit, cause the processor unit to perform the steps of: analyzing said fraction of said rotational order command list responsive to said maximum analysis time.

17. A computer program product for hard disk drive command queue ordering in a disk drive as recited in claim 16 wherein said instructions, when executed by said processor unit, cause the processor unit to perform the steps of: selecting a skip-sort interval based upon said maximum analysis time and a current queue depth of said rotational order command list.

18. Apparatus for hard disk drive command queue ordering comprising:

a processor;

said processor for receiving a command from a host;

said processor for placing said command in a rotational order command list;

said processor for analyzing a fraction of said rotational order command list; and said processor for analyzing commands with a maximum selection probability.

19. Apparatus for hard disk drive command queue ordering as recited in claim 18 wherein said processor for identifying a maximum analysis time before a currently executing command is completed; and for selecting a skip-sort interval based upon said maximum analysis time and a current queue depth of said rotational order command list.

20. Apparatus for hard disk drive command queue ordering as recited in claim 18 wherein said processor for traversing the entire rotational order command list and for analyzing said commands with said maximum selection probability.

* * * * *